United States Statutory Invention Registration [19]

[11] Reg. Number: H977

Kurzbuch et al. [43] Published: Nov. 5, 1991

[54] APPARATUS AND METHOD FOR INDUCING BLOCKING IN PLASTIC FILMS UNDER KNOWN CONDITIONS

[75] Inventors: Werner Kurzbuch, Baytown; Larry J. Mitchell; Andor Scheller, both of Houston, all of Tex.

[73] Assignee: Exxon Chemical Company, Baytown, Tex.

[21] Appl. No.: 593,153

[22] Filed: Oct. 5, 1990

[51] Int. Cl.[5] ..... B30B 1/02; B29G 43/22

[52] U.S. Cl. ..... 100/179; 100/145; 156/228

*Primary Examiner*—Richard D. Lovering
*Assistant Examiner*—Greg M. Sweet
*Attorney, Agent, or Firm*—Ben C. Cadenhead; T. Dean Simmons

[57] ABSTRACT

The present invention is directed to an apparatus and method useful for inducing blocking in plastic film samples under known laboratory conditions. The test device of the present invention comprises a base platen and a movable platen disposed for cooperation to engage and apply a known, preferably multiplied, compressive force to a plurality of plastic samples. The compressive force is transferred to the movable platen through a thrust member from a lever arm pivotable about a pivot, preferably a hinge, above the base platen. Along the lever arm are disposed a plurality of weight receiving locations for engagement by a hanger supporting one or more selected weights. The test device of the present invention permits higher compressive forces to be applied to plastic test samples under laboratory conditions without requiring the use of heavier weights and produces more reproducible compressive forces than prior art methods.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

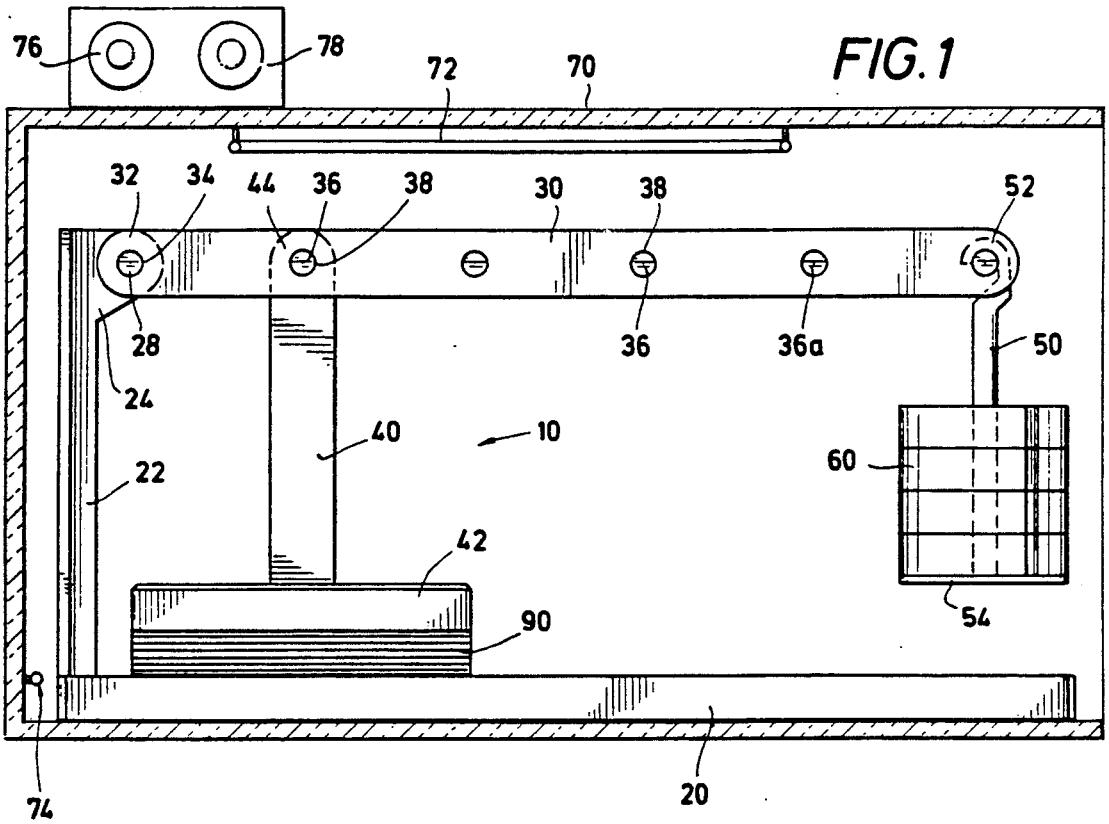
FIG. 1
FIG. 2
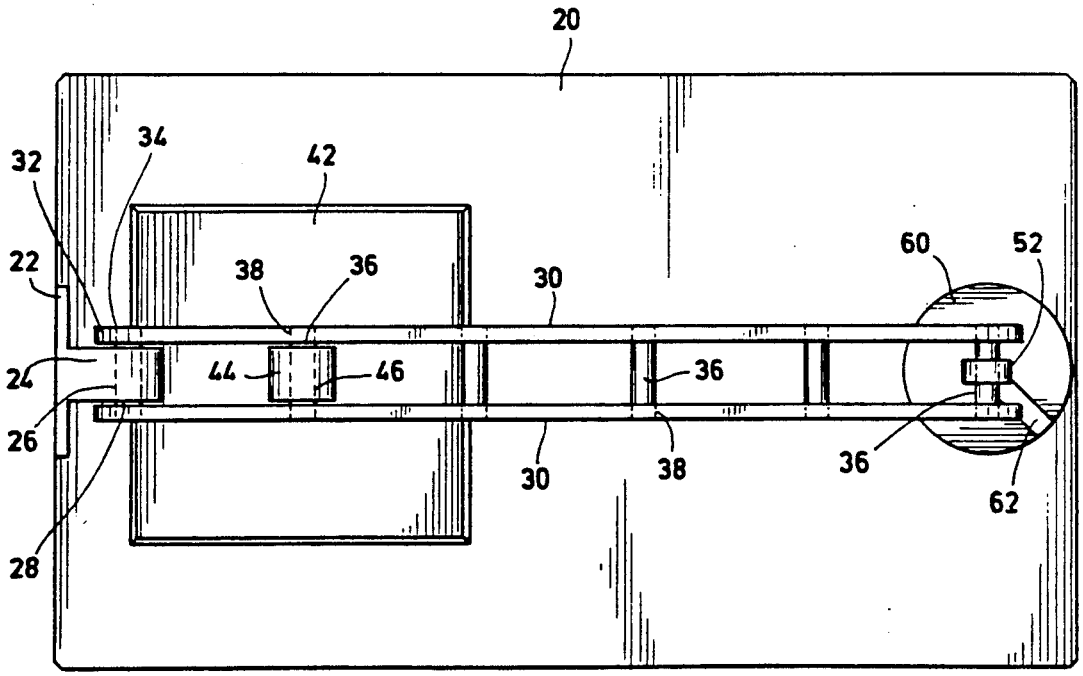

APPARATUS AND METHOD FOR INDUCING BLOCKING IN PLASTIC FILMS UNDER KNOWN CONDITIONS

BACKGROUND OF THE INVENTION

1. Field of the Invention

The present invention generally relates to an apparatus and method useful for inducing blocking in plastic films under known conditions. More specifically, the present invention is directed to an apparatus and method for applying a known force to a plurality of plastic film samples maintained at a predetermined temperature for a predetermined time to study induced blocking in plastic film samples under known laboratory conditions.

2. Description of the Background

Blocking is essentially a sticking together of the surfaces of thermoplastic films or coatings. Accordingly, blocking is an undesirable characteristic. The tendency of thermoplastic films and coatings to suffer blocking increases with elevated temperatures and with increasing contact pressure between adjacent films or coatings.

It is important to be able the blocking tendency of thermoplastic films and coatings under various conditions. Accordingly, methods and procedures have been developed to study blocking in the laboratory. ASTM Standard D-3354 defines blocking as essentially a sticking together of the surfaces of adjacent thermoplastic films or coatings under the exclusion of air. Various ASTM Standards set forth test methods to measure the blocking force, i.e., the force required to separate blocked film surfaces.

The preparation of blocked film samples for testing, however, has traditionally been performed mainly using various non-standardized methods. In a commonly used method weights are merely placed upon film samples in an oven to produce the desired contact stresses in an environment of elevated temperatures. Because these methods are non-standardized, the researcher is often unable to reproduce prior results. Further, the researcher is often unable to correlate his results with those of other workers who have used other testing methods. Reproducibility and correlation of results are poor due to the inability to precisely duplicate placement of the weight on the samples to assure uniform contact stress. In addition to poor reproducibility and correlation, these methods suffer from a variety of other shortcomings. For example, the attainable stress levels are limited by the weights which may be safely handled in a hot environment, by the weight which the oven can support and by the size of the oven.

Accordingly, there has been a long felt but unfulfilled need in the testing industry for apparatus and methods for obtaining high and reproducible levels of compressive force to block samples in a hot oven while requiring only moderate weights and moderate oven space.

SUMMARY OF THE INVENTION

The present invention is directed to an apparatus and method for inducing blocking in plastic films under a wide range of laboratory pressures and temperatures. The apparatus and method of the present invention permit reproducible results to be achieved using moderate weights and requiring only moderate oven space. Using the apparatus and method of the present invention the blocking tendencies of thermoplastic films and coatings may be studied under any desired conditions, including the most extreme conditions which those films and coatings may be expected to encounter. Study under these extreme conditions is a significant improvement over the traditional methods allowing study only under relatively mild conditions and with poor reproducibility of results.

The test apparatus of the present invention includes a test device for applying a known, but variable compressive force to a plurality of stacked, plastic film samples. The test device comprises a base platen and a movable platen disposed for cooperation therewith. A rigid, fixed support extends above the base platen. Pivoted, preferably hinged, to the fixed support is a lever arm characterized by a plurality of weight receiving locations disposed thereon. Affixed to the movable platen and in contact with, preferably hinged to, the lever arm is a thrust member for transmitting a force from the lever arm to the movable platen for compressing the plastic samples between the movable platen and the base platen. In the presently preferred embodiment the thrust member contacts the lever arm at a point between its pivot with the fixed support and the weight receiving locations. In the presently preferred embodiment the device further includes a hanger for hanging a weight from one of the weight receiving locations, together with a plurality of weights from which a desired weight may be chosen. The test device of the present invention is configured to fit within a conventional oven.

In the method of the present invention a plurality of plastic film samples are disposed between the base platen and the movable platen of the test device. A desired weight is selected from the plurality of weights and applied to the lever arm at a weight receiving location to exert a compressive force of the plastic samples through the movable platen. In the presently preferred method selection and position of the weight along the lever arm permit a wide variety of forces to be applied to the samples. In the presently method the applied force is multiplied by the mechanical advantage of the lever arm, permitting testing under more severe conditions without requiring the use of heavier weights. Finally, the samples are heated to a desired temperature and maintained at that temperature for a predetermined time while being subjected to the compressive force. In this manner, severe, yet precise and reproducible testing conditions are produced.

The apparatus and method of the present invention have solved the long felt, but unfulfilled need for an apparatus and method for studying blocking of thermoplastic films and coatings under severe, but reproducibile laboratory conditions, in confined spaces with safely handled equipment. These and other meritorious features and advantages of the present invention will be more fully appreciated from the following detailed description and claims.

BRIEF DESCRIPTION OF THE DRAWINGS

Other features and intended advantages of the present invention will be more readily apparent to the references to the following detailed description in connection with the accompanying drawings, wherein:

FIG. 1 is a side elevation of a test device in accord with the present invention disposed within an oven illustrated in partial cross-section; and FIG. 2 is a top elevation of a test device in accord with the present invention.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

The present invention provides an method useful for inducing blocking in a plurality of plastic film samples under controlled laboratory conditions. The apparatus and method of the present invention provide means for reproducibly applying a known force to plastic samples at elevated temperatures wherein the force is reproducibly multiplied and applied using a lever arm.

The testing device 10 of the present invention comprises a base platen 20. Base platen 20 must be of sufficient size and shape to hold a plurality of standard samples 90 and to provide a stable foot for supporting test device 10. In the presently preferred embodiment, support is provided by support arm 22 vertically disposed at one end of base platen 20 provides a rigid, fixed support. Support arm 22 terminates at its end away from base platen 20 in flange 24 having therein bore 26. Test device 10 further includes lever arm 30. In the presently preferred embodiment lever arm 30 is comprised two, identical, interconnected arms 30. Lever arm 30 and support 22 pivot with respect to one another. In the presently preferred embodiment, lever arm 30 is hingedly connected at a first end 32 with the flange 24 of support 22 by hinge pin 28 passing through bore 26 in flange 24 and being fixed within bores 34 in lever arms 30. Lever arm 30 is further characterized by a plurality of bores 38 disposed along its length, preferably spaced equidistantly. Fixed within each bore 38 and connecting the two identical arms of lever arm 30 are a plurality of connecting pins 36. Pins 36 also provide weight receiving locations from which weight hanger 50 may be hung. Further, pins 36 provide points at known locations for contacting thrust member 40 with lever arm 30. In the presently preferred embodiment, thrust member 40 includes bore 46 through end 44 to permit hinged engagement with one of pins 36 of lever arm 30. In the illustrated and presently preferred embodiment, thrust member 40 is hingedly suspended from pin 36 nearest the pivot or hinge between lever arm 30 and support 22. In an alternative embodiment, thrust member 40 may be capable of being moved to be engaged by any of pins 36. For example, pins 36 may be removable to permit placement of thrust member 40 at any pin 36. In a further alternative, thrust member 40 simply may terminate with a thrust receiving top surface for contact with the bottom of pin 36. Thrust member 40 is affixed at its opposite end to movable platen 42 for connecting and applying a compressive force to a plurality of plastic film samples 90 disposed between movable platen 42 and base platen 20. Hanger 50 includes hook 52 on a first end for engaging connecting pins 36 of lever arm 30. Opposite hook 52 of hanger 50 is weight support plate 54 upon which one or more weights 60 may be disposed. Weights 60 are preferably circular, flat disks each having a slot 62 to permit easy loading and stacking on plate 54 of hanger 50.

Test device 10 may be constructed of any material which will withstand the elevated temperatures and environment of oven 70. Although the device 10 is often constructed of steel, particularly preferred materials are low density materials, including aluminum, magnesium, other lightweight alloys and even plastics capable of withstanding the highest temperatures to which the device 10 will be subjected. Further, the overall dimensions of the test device must conform to the interior dimension of conventional laboratory test ovens in which it will be disposed. Weights 10 are constructed of an appropriate high density material, e.g., brass, bronze, steel or the like.

The apparatus of the present invention useful for inducing blocking in a plurality of plastic film samples comprises in addition to test device 10 a conventional oven 70 equipped with electric or other conventional heater 72. Oven 70 includes conventional temperature control 78 and thermostat 74 for controlling the temperature in the interior of oven 70. Optionally oven 70 may include timer 76 for controlling the length of the heating cycle.

The method of the present invention comprises disposing samples 90 between base platen 20 and movable platen 42 of test device 10. The compressive force applied by platen 42 at samples 90 is comprised of the weights of platen 42 and thrust member 40 plus the force applied through thrust member 40 from the weights of arm 30, hanger 50 and weights 60 and the locations on lever arm 30 of hanger 50, of the contact point between lever arm 30 and thrust member 40 and of the pivot between lever arm 30 and support 22. The force applied by platen 42 may be greater or lesser than the weights 60 employed, depending upon the foregoing locations. Those skilled in the art can readily determine the force from the mechanical advantage of the lever and the weights of platen 42, thrust member 40, arm 30, hanger 50 and weights 60. Finally, the force is easily verified by applying it to a suitable weighting device disposed on base platen 20 under movable plate 42.

In the illustrated embodiment, the compressive force applied to samples 90 by platen 42 would equal five times the weight of hanger 50 and weights 60 plus the force applied by the weights of platen 42, thrust member 40 and arm 30. The force applied to platen 42 is easily changed by removing or adding weights 60 or relocating hanger 50. For example, when relocated to connecting pin **36*a*, the compressive force applied is diminished to four times the weight of hanger 50 and weights 60 plus the force developed by the weights of platen 42, thrust member 40 and lever arm 30. In an alternative embodiment, lever arm 30 may extend beyond hinge pin 28 and include an appropriate, variable means to counterbalance the weights of arm 30, platen 42, thrust member 40 and hanger 50, so that the force applied to platen 42 may be determined solely from the weight of weights 60 and the mechanical advantage of the chosen lever configuration. In any event, those skilled in the art can readily determine the compressive force applied by platen 42 from the mechanical advantage of the particular lever compression chosen and the weights of platen 42, thrust member 40, arm 30, hanger 50 and weights 60**.

Finally, blocking is induced by heating the samples 90 in oven 70 to a desired temperature conveniently set with control 78. That temperature is maintained for a predetermined time, conveniently using timer 76. Accordingly, a wide range of desired compressive forces, temperatures and times may reproducibly be developed to improve the laboratory study of blocking in thermoplastic films and coatings.

The foregoing description of the invention has been directed in primary part to a particular, preferred embodiment in accordance with the requirements of the patent statutes and for purposes of explanation and illustration. It will be apparent, however, to those skilled in the art that many modifications and changes in the specifically described apparatus and method may be made without departing from the scope and spirit of the invention. For example, lever arm 30 alternatively may be constructed with a single arm member 30 having notches on the top from which hanger 50 may be hung and notches on the bottom for engaging end 44 of thrust member 40. Therefore, the invention is not restricted to the preferred embodiment illustrated but covers all modifications which may fall within the scope of the following claims.

What is claimed is:

1. An apparatus useful for inducing blocking between a plurality of plastic samples comprising:

an oven;

means for controlling the temperature within said oven; and a sample testing device for applying a known, but variable, compressive force to a plurality of plastic samples, said testing device disposed with said oven and comprising, a base platen;

a movable platen disposed for cooperation with said base platen;

a rigid, fixed support extending above said base platen;

a lever arm, said lever arm pivotable about a pivot with respect to said support;

a plurality of weight receiving locations disposed along said lever arm; and a thrust member for transmitting a force from said lever arm to said movable platen.

2. The apparatus for claim 1 wherein said temperature control means comprises:

a heater disposed in said oven;

a variable control for setting a desired temperature in said oven; and a thermostat for controlling said heater to maintain said set temperature.

3. An apparatus useful for applying a known, but variable compressive force to a plurality of plastic samples, comprising:

a base platen;

a movable platen disposed for cooperation with said base platen;

a rigid, fixed support extending above said base platen;

a lever arm, said lever arm pivotable about a pivot with respect to said support;

a plurality of weight receiving locations disposed along said lever arm; and a thrust member for transmitting a force from said lever arm to said movable platen.

4. The apparatus of claim 3 wherein said thrust member is hingedly affixed to said lever arm and rigidly affixed to said movable platen.

5. The apparatus of claim 3 wherein said support and said lever arm are hinged at said pivot.

6. The apparatus of claim 5 wherein said thrust member is hingedly suspended from said lever arm.

7. The apparatus of claim 3 wherein said thrust member contacts said lever arm between said pivot and said plurality of weight receiving stations.

8. The apparatus of claim 3 further comprising a hanger for suspending a weight from at least one of said weight receiving locations.

9. The apparatus of claim 8 further comprising a weight for cooperation with said hanger.

10. A method of inducing blocking in a plurality of plastic samples, comprising:

disposing said samples between a base platen and a movable platen, said movable platen in contact through a thrust member with a lever arm pivotable about a pivot above said base platen;

selecting from a plurality of weights a desired weight;

applying said selected weight at a point disposed along said lever arm to produce a compressive force on said samples through said movable platen;

heating said samples to a desired temperature; and maintaining said samples at said temperature for a predetermined time while applying said compressive force.

11. The method of claim 10 wherein said weight is applied at one of a plurality of weight receiving locations disposed along said lever arm.

12. The method of claim 10 wherein said movable platen is hinged to said lever arm between said pivot and said point at which said weight is applied.

13. The method of claim 10 wherein said lever arm and said base platen are maintained substantially parallel while applying said weight.

14. The method of claim 10 wherein said weight is applied by hanging said weight from said lever arm.

* * * * *